United States Patent
Liu

(10) Patent No.: US 8,150,249 B2
(45) Date of Patent: Apr. 3, 2012

(54) METHOD AND SYSTEM FOR DETECTING HORIZONTAL ORIENTATION OF CAMERA DEVICE

(75) Inventor: Jun Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/578,185

(22) Filed: Oct. 13, 2009

(65) Prior Publication Data

US 2011/0052163 A1    Mar. 3, 2011

(30) Foreign Application Priority Data

Aug. 25, 2009    (CN) .......................... 2009 1 0306039

(51) Int. Cl.
*G03B 17/00*      (2006.01)
*H04N 5/228*      (2006.01)

(52) U.S. Cl. ............ 396/50; 396/53; 348/208.2
(58) Field of Classification Search .......... 396/50, 396/53; 348/208.2
See application file for complete search history.

(56) References Cited

U.S. PATENT DOCUMENTS

| 2007/0047943 A1* | 3/2007 | Seo et al. | .......... 396/141 |
| 2010/0040356 A1* | 2/2010 | Ishikawa | .......... 396/124 |

* cited by examiner

*Primary Examiner* — Rochelle-Ann J Blackman
(74) *Attorney, Agent, or Firm* — Altis Law Group, Inc.

(57) ABSTRACT

A method for detecting horizontal orientation of the picture in a camera device, and the method includes the following steps. A plurality of orientation changes are detected in the camera device and converted to voltage signals by a gravity sensor module. The voltage signals are received by a data processing module and value of the angle in which the camera device deviated from a defined horizontal orientation is calculated. The value of the angle in which the camera device deviated from the defined horizontal orientation is received by an output module. The output module indicates how to adjust the camera device to the defined horizontal orientation.

2 Claims, 3 Drawing Sheets

METHOD AND SYSTEM FOR DETECTING HORIZONTAL ORIENTATION OF CAMERA DEVICE

BACKGROUND

1. Technical Field

The present disclosure relates to a method and system for detecting horizontal orientation of a picture in a camera device.

2. Description of Related Art

In photography, in order to maintain precise aim of a camera device when taking a picture a tripod is required. However, the tripod is very inconvenient to use.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
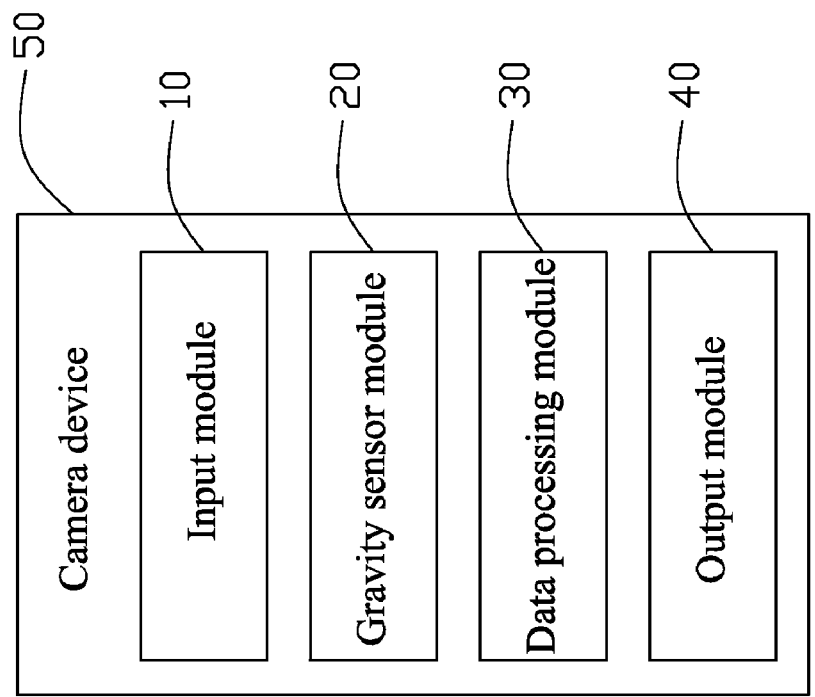
FIG. 1 is a block diagram of a system for detecting horizontal orientation of a camera device, in accordance with an embodiment.

Referring to FIG. 1, a system for detecting horizontal orientation of a camera device includes an input module 10, a gravity sensor module 20, a data processing module 30, and an output module 40. The input module 10 includes a plurality of predetermined angle values for inputting an angle threshold value to the camera device 50. The gravity sensor module 20 is vertically positioned in the camera device 50 for converting changes to voltage signals. When the camera device 50 is deviated from the true horizontal orientation, parallel to the ground, the gravity sensor module 20 outputs a corresponding voltage signal different from that of when the camera device 50 is properly horizontally orientated.

Figure 2:
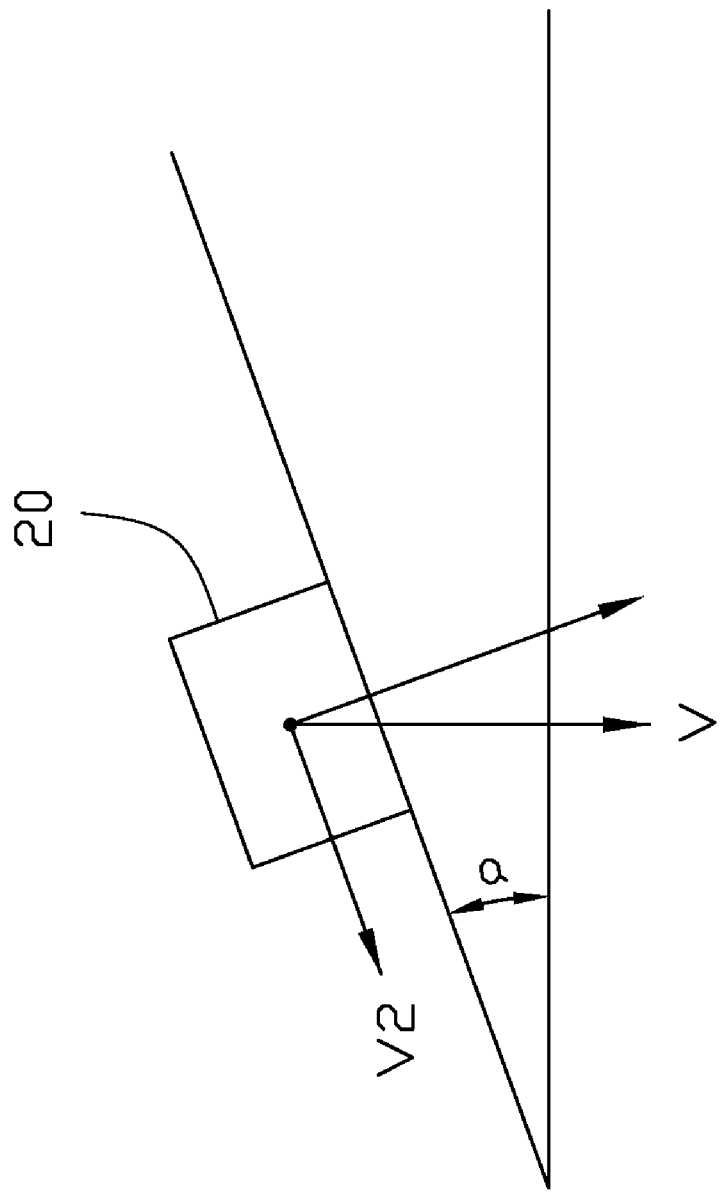
FIG. 2 is an isometric view of a gravity sensor detecting output voltages of the system of FIG. 1.

When the camera device 50 is aligned with the true horizontal orientated, the output voltage of the gravity sensor module 20 is V1. Referring to FIG. 2, when the camera device 50 is deviated from the true horizontal orientation at an angle $\alpha$, the output voltage of the gravity sensor module 20 is then V2. When the gravity sensor module 20 is only under the influence of gravity acceleration, the output voltage of the gravity sensor module 20 is V. The data processing module 30 receives the output voltages V1, V2, and V from the gravity sensor module 20, and calculates the value of the angle a according to the output voltages V1, V2, and V. According to the relationship of the output voltages V1, V2, and V, the value of the angle a can be calculated according to: $\alpha = \arcsin[(V2-V1)/V]$. The output module 40 receives the value of the angle $\alpha$, and indicates to the user to adjust orientation of the camera device 50 when the value of the angle $\alpha$ exceeds the angle threshold value.

Figure 3:
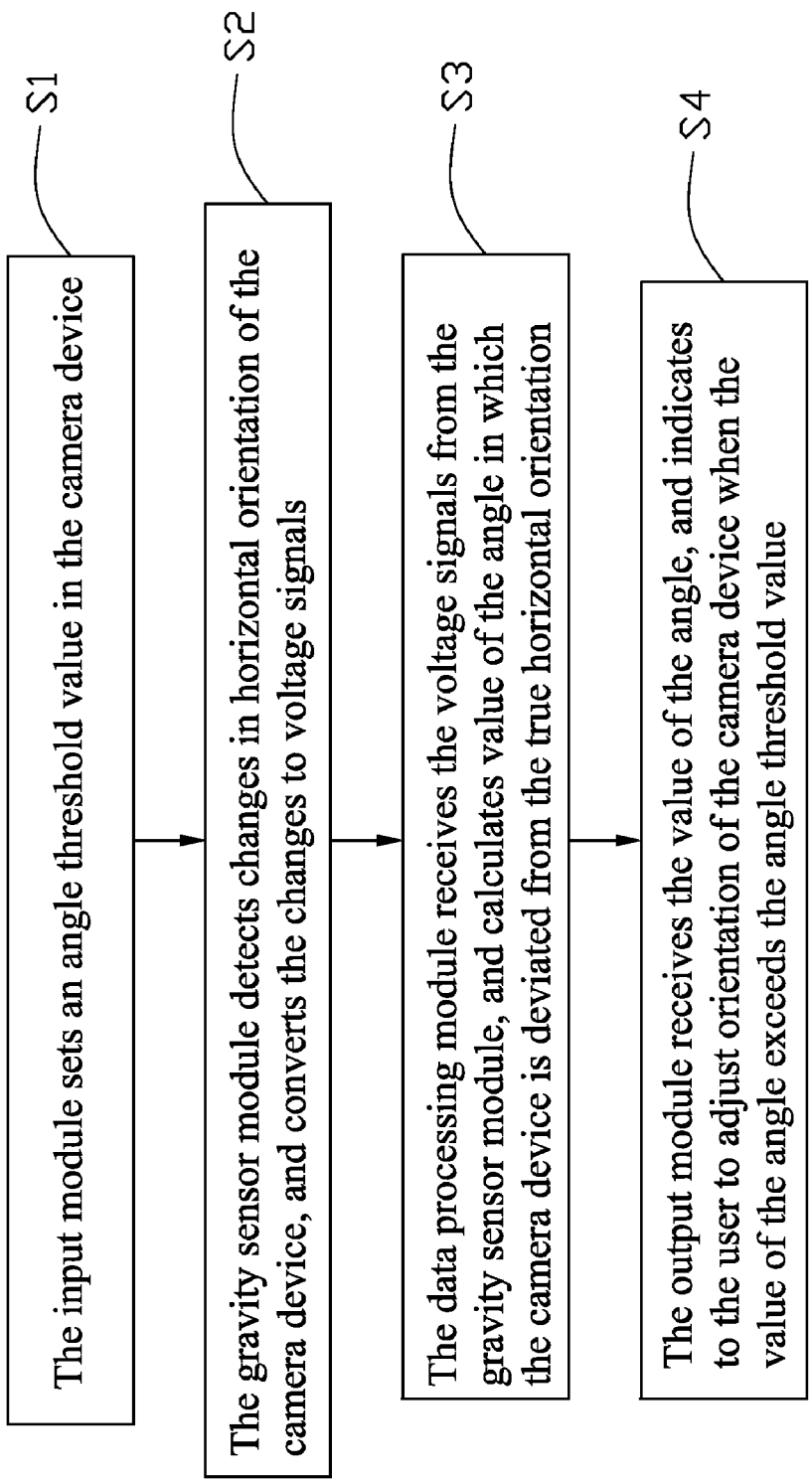
FIG. 3 is a flow chart of a method for detecting horizontal orientation of a camera device.

FIG. 3 is a flow chart illustrating a method for detecting horizontal orientation in a camera device. Depending on the embodiment, certain steps described below may be removed, while others may be added, and the sequence of the steps may be altered.

In one embodiment, the method for exposing photograph by separated parts in a camera device utilizing the above-described system includes the following steps:

S1: the input module 10 sets an angle threshold value in the camera device 50;

S2: the gravity sensor module 20 detects changes in horizontal orientation of the camera device 50, and converts the changes to voltage signals;

S3: the data processing module 30 receives the voltage signals from the gravity sensor module 20, and calculates value of the angle in which the camera device 50 is deviated from the true horizontal orientation;

S4: the output module 40 receives the value of the angle, and indicates to the user to adjust orientation of the camera device 50 when the value of the angle exceeds the angle threshold value.

In another embodiment, the output module 40 does not judge whether the value of the angle a exceeds the angle threshold value. The output module 40 indicates to the user to adjust the camera device 50 directly when it receives the value of the angle a to keep the camera device 50 horizontally oriented.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method for detecting horizontal orientation of the picture in a camera device, the method comprises the following steps:

inputting an angle threshold value in the camera device using an input module of the camera device;

detecting orientation changes in the camera device and converting the orientation changes to voltage signals by a gravity sensor module of the camera device;

calculating an angle value, $\alpha$, which the camera device has deviated from a defined horizontal orientation by a data processing module; and indicating how to adjust the camera device to properly align the camera device along the defined horizontal orientation when the angle value, $\alpha$, exceeds the angle threshold value;

wherein when the camera device is on the true horizontal orientation, an output voltage of the gravity sensor module is V1; when the camera device is at the angle value, $\alpha$, an output voltage of the gravity sensor module is V2; when the camera device is under an influence of gravity acceleration, an output voltage of the gravity sensor module is V, the angle value, $\alpha$, is calculated in accordance with: $\alpha = \arcsin[(V2-V1)/V]$.

2. A system for detecting horizontal orientation of the picture in a camera device, comprising:

an input module for inputting an angle threshold value in the camera device;

a gravity sensor module capable of detecting orientation changes, and converting the orientation changes to voltage signals;

a data processing module capable of receiving the voltage signals from the gravity sensor module and calculating an angle value, α, which the camera device deviates from a defined horizontal orientation; and an output module capable of receiving the angle value, α, indicating how to adjust the camera device to the defined horizontal orientation, and prompting an operator to adjust the camera device when the angle value, α, deviated from a true horizontal orientation exceeds the angle threshold value;

wherein when the camera device is on the true horizontal orientation, an output voltage of the gravity sensor module is V1; when the camera device is at an angle value, α, an output voltage of the gravity sensor module is V2; when the camera device is under an influence of gravity acceleration, an output voltage of the gravity sensor module is V, the angle value, α, is calculated according to: α=arcsine [(V2-V1)/V].

* * * * *